United States Patent [19]

Mineyama

[11] Patent Number: 4,825,112
[45] Date of Patent: Apr. 25, 1989

[54] STATOR IN STEP MOTOR
[75] Inventor: Katsumi Mineyama, Obu, Japan
[73] Assignee: Aisan Kogyo Kabushiki Kaisha, Obu, Japan
[21] Appl. No.: 168,478
[22] Filed: Mar. 15, 1988

Related U.S. Application Data

[63] Continuation of Ser. No. 932,589, Nov. 20, 1986, abandoned.

[30] Foreign Application Priority Data

Dec. 3, 1985 [JP] Japan .................. 60-186478

[51] Int. Cl.⁴ .............................. H02K 3/00
[52] U.S. Cl. ............................... 310/71; 310/49 R; 310/194
[58] Field of Search ............... 310/49 R, 49 MM, 71, 310/194, 261, 263, 267

[56] References Cited

U.S. PATENT DOCUMENTS

| 4,074,157 | 2/1978 | Lace | 310/194 X |
| 4,114,056 | 9/1978 | Nimura | 310/194 X |
| 4,186,322 | 1/1980 | Besson | 310/194 |
| 4,188,555 | 2/1980 | Suzuki et al. | 310/194 X |
| 4,381,465 | 4/1983 | Renkl et al. | 310/49 R |
| 4,623,809 | 11/1986 | Westley | 310/49 R |
| 4,639,628 | 1/1987 | Kobayashi et al. | 310/71 X |

Primary Examiner—Mark O. Budd
Attorney, Agent, or Firm—Dennison, Meserole, Pollack & Scheiner

[57] ABSTRACT

A stator in a step motor comprising first and second supports, and conductive connecting members each having one end connected to any one of a plurality of terminal wires of a stator coil and the other end connected to a driving power supply harness adapted for supplying driving power to the stator coil and having the same driving power supply voltage polarity as the terminal wire. The connecting members are divided according to their driving power supply voltage polarities into groups which are mounted separately to the first and second supports. The first and second supports are disposed on the outer periphery of the stator with a maximum space therebetween.

2 Claims, 3 Drawing Sheets

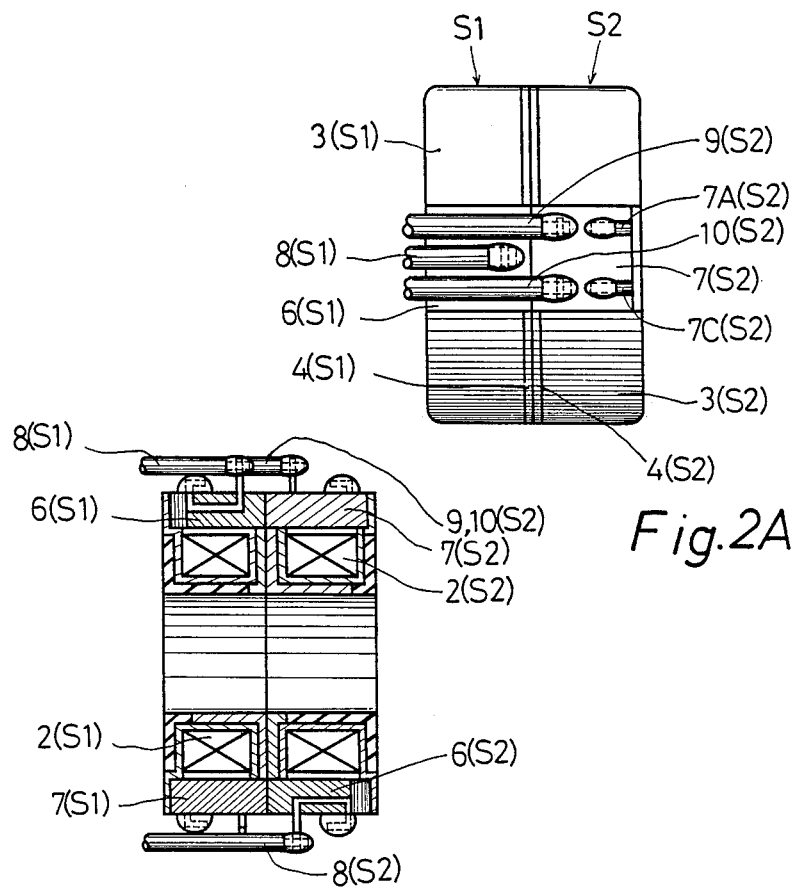
Fig.2A
Fig.2B
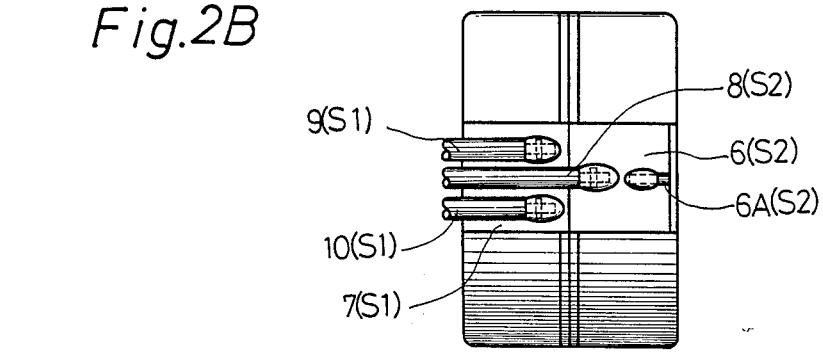
Fig.2C

STATOR IN STEP MOTOR

This is a continuation of copending application Ser. No. 932,589, filed Nov. 20, 1986, now abandoned.

BACKGROUND OF THE INVENTION

The present invention relates to a stator in a step motor provided with two supports for electrically connecting a stator coil of the step motor and external driving power supply harnesses.

In a conventional stator in a step motor, terminal wires of a coil formed in the stator have been connected directly to external driving power supply harnesses by soldering or other means, as is disclosed in Japanese Utility Model Laid-Open Publication No. 57-151957 or Japanese Utility Model Laid-Open Publication No. 57-146307, or a plurality of connecting members or terminals are collectively mounted to a support or terminal base disposed at a portion of the stator to connect the terminal wires of the coil and driving power supply harnesses through the terminals, as is disclosed in Japanese Utility Model Laid-Open Publication No. 59-18550.

FIG. 3 shows the above mentioned prior art in which terminal wires 21A, 21B and 21C of a coil 21 are soldered at respective connecting points PA, PB and PC directly to driving power supply harnesses 22A, 22B and 22C and then taped over the connecting points. FIG. 4 shows a prior art terminal mounting member 31 secured to a case of a step motor 30 and including terminals 31A, 31B and 31C having respective lower ends (not shown) connected to terminal wires of the coil (not shown) and respective upper ends connected to driving power supply harnesses 32A, 32B and 32C.

In the above described prior art shown in FIG. 3, as the terminal wires 21A, 21B and 21C of the coil 21 are directly connected to the driving power supply harnesses 22A, 22B and 22C, any strong external force applied to the driving power supply harnesses 22A, 22B and 22C will disadvantageously cause the terminal wires 21A, 21B and 21C of the coil 21 to be broken.

In the prior art shown in FIG. 4, a smaller-sized stator will require a smaller-sized terminal mounting member or terminal base 31, which results in closer spacing between the connecting effeciency is decreased and furthermore, due to such a closer spacing between terminals tends to cause short circuit.

SUMMARY OF THE INVENTION

It is a primary object of the present invention to overcome the above disadvantages associated with the prior art by providing two supports adapted for connection between terminal wires of a coil of a stator and driving power supply harnesses and disposed on the outer periphery of the stator apart from each other, for example with a maximum circumferential space of 180 degrees therebetween, each of the supports being connected to either one of the groups into which the driving power supply harnesses are divided according to their supply voltage polarities.

It is another object of the present invention to provide a stator for a step motor which may prevent short circuit and which may increase ease of wire connecting operation.

It is a further object of the present invention to provide a stator for a step motor which may prevent the terminal wires of the stator coil from being broken due to any external force.

According to the present invention, there is provided a stator in a step motor which comprises first and second supports, and conductive connecting members each having one end connected to any one of a plurality of terminal wires of a stator coil and the other end connected to a driving power supply harness adapted for supplying driving power to the stator coil and having the same driving power supply voltage polarities into groups which are mounted separately to the first and second supports, the first and second supports being disposed on the outer periphery of the stator with a maximum space therebetween.

In the above structure, the first and second supports are disposed on the outer periphery of the stator with a relative circumferential space such as of 180 degrees, and they are connected to the groups of harnesses to each of which driving power supply voltage of the respective polarity is applied. This allows the mounting space between the connecting members to which the driving power supply harnesses are connected to be widended to prevent short circuit and, at the same time, application of a strong external force to the harnesses imparts a tensile force only to the connecting members and no tensile force will act on the terminal wires of the coil, preventing any breakage of the coil.

The invention will become more fully apparent from the claim and the description as it proceeds in connection with the drawings.

BRIEF DESCRIPTION OF THE DRAWINGS

FIGS. 2A, 2B and 2C are plan, vertical sectional and bottom views according to the present invention, respectively.

DETAILED DESCRIPTION OF THE PREFERRED EMBODIMENTS

Figure 1:
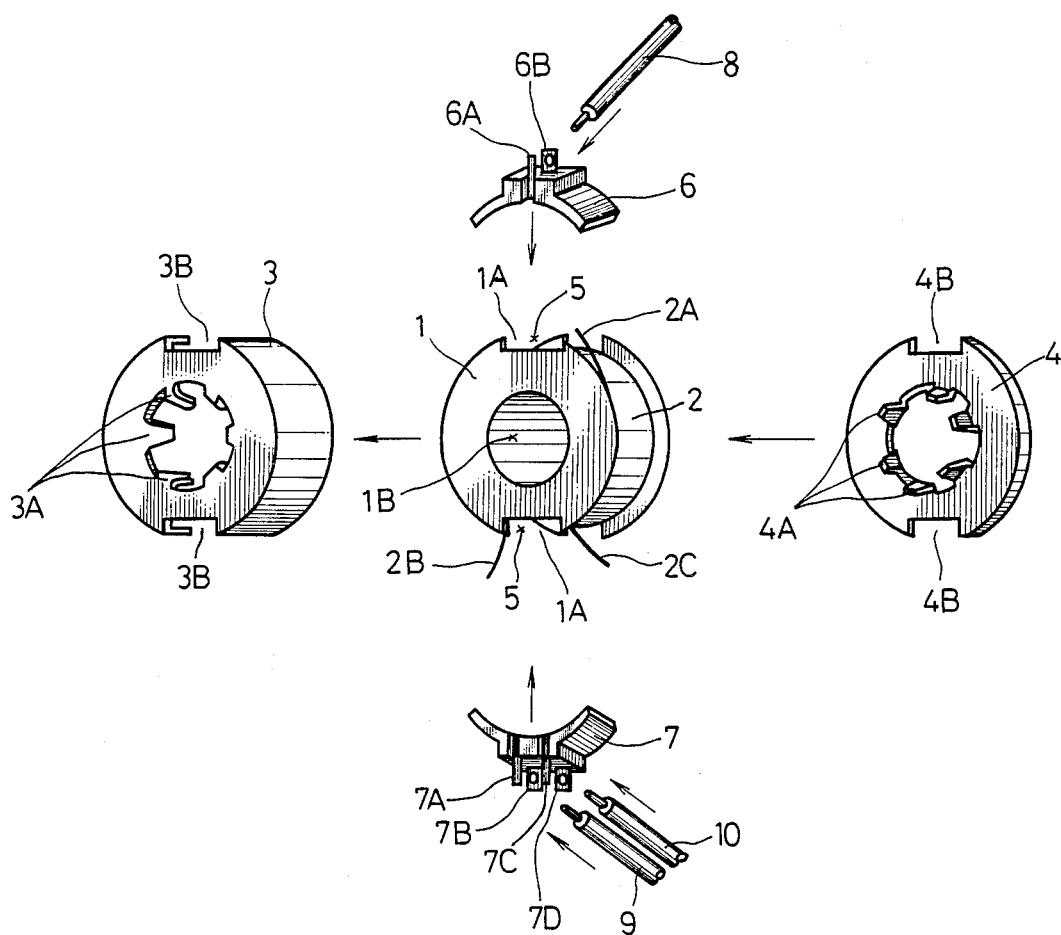
FIG. 1 is an exploded view showing the structure of a preferred embodiment according to the present invention.
Figure 3:
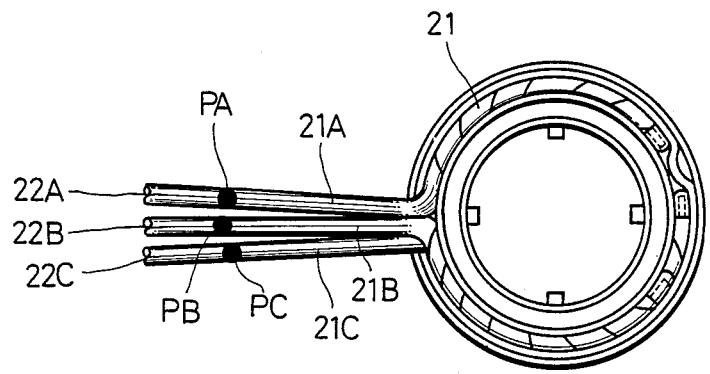
FIGS. 3 and 4 are views illustrating the prior arts.
Figure 4:
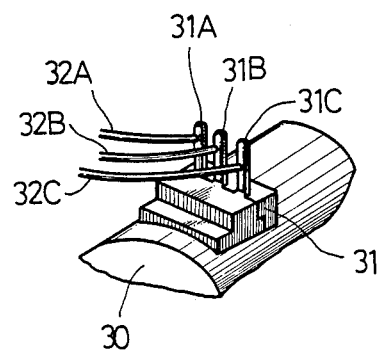

Referring now to FIG. 1 which is an exploded view of a stator in a step motor, a coil 2 is wound around a bobbin 1 having cutouts 1A, and an intermediate terminal wire 2A, a starting terminal wire 2B and an ending terminal wire 2C are drawn out of the coil 2. Then, supports 6 and 7 to be described are mounted to the respective cutouts 1A of the bobbin 1. A cup-shaped stator member 3 having a plurality of polar teeth 3A formed on the inner periphery thereof and cutouts 3B is fitted onto the coil 2 in such a manner that the polar teeth 3A are inserted in a hollow portion 1B of the bobbin 1 with the cutouts 3B aligned with the cutouts 1A of the bobbin 1. After assembling of the cup-shaped stator member 3, the bobbin 1 and the supports 6 and 7 as described above, a plate 4 having a plurality of polar teeth 4A formed on the inner diameter thereof and cutouts 4B is mounted on the bobbin 1 on the opposite side thereof with respect to the cup-shaped stator member 3 in such a manner that the polar teeth 3A and the polar teeth 4A are positioned alternately with the cutouts 4B aligned with the cutouts 1A of the bobbin 1.

Thus, the bobbin 1, cup-shaped stator member 3, plate 4 and supports 6 and 7 are assembled and firmly attached to one another by adhesive or the like. The support 6 carries terminals 6A and 6B which are interconnected within the support 6 to be relatively conductive. To the terminal 6A is connected the intermediate terminal wire 2A of the coil 2, while to the other terminal 6B is connected a driving power supply harness 8 to which supply voltage, for example, of the positive electrode is applied. The support 7 carries terminals 7A and 7B and further terminals 7C and 7D. The terminals 7A and 7B are interconnected within the support 7 to be relatively conductive, and so are the terminals 7C and 7D. To the terminal 7A is connected the starting terminal wire 2B of the coil 2, and to the terminal 7C is connected the ending terminal wire 2C of the coil 2. On the other hand, to the terminal 7B is connected a driving power supply harness 9, and to the terminal 7D is connected another driving power supply harness 10.

In the above connection, the voltage to be applied to the driving power supply harness 8 connected to the support 6 is positive in polarity and the voltage to be applied to the driving power supply harnesses 9 and 10 connected to the support 7 is negative in polarity, and therefore, even if there arises short circuit between the terminals 7A and 7C or 7B and 7D, it occurs at the same potential and generates no spark, causing no damage to the terminals and harnesses. As the supports 6 and 7 are disposed with a circumferential space of 180 degrees therebetween, falling of the driving power supply harness 8 out of the terminal 6B due to long time vibration or external force would cause almost no fear of short circuit thereof with the driving power supply harness 9 or 10. Falling of the harness 9 or 10 out of the terminals 7B or 7C results in the same.

FIGS. 2A to 2C show of the present invention in which the step motor has two joined stators of the type shown in FIG. 1, that is, a first stator S1 and a second stator S2 joined to each other. In FIGS. 2A to 2C, like reference numerals are given to the members corresponding to those in FIG. 1, and symbols (S1) and (S2) affixed to the reference numerals means that the members belong to the first and second stators S1 and S2.

As illustrated by FIGS. 2A, 2B and 2C, the stator assembly of the step motor is connected to the driving power supply harnesses 8,9, and 10 so as to supply electric current to the stators S1 and S2. The stator coils 2(S1). 2(S2) are positioned in the housings or cup-shaped members 3(1), 3(S2). The housings 3(S1), 3(S2) are attached to each other by way of plates 4(S1), 4(S2).

The connecting members or supports 6(S1), 6(S2) and 7(S1), 7(S2) are for connecting the terminal ends 6A, 7A, and 7C or the stator coils 2(S1), 2(S2) to the respective driving power supply harnesses 8,9, and 10. The first pair, S1, of connecting members 6,7 are mounted on a peripheral surface of the cylindrical housing 3(S1).

As illustrated by FIG. 2A, one driving power supply harness 8(S1) is connected at the top peripheral surface of cylindrical housing 3(S1) through connecting member 6(S1). As shown in FIG. 2C, the other two driving power supply harnesses 9(S1) and 10(S1) are connected at the bottom peripheral surface of the cylindrical housing 3(S1) through connecting member 7(S1).

The second pair, S2, of connecting members 6,7 are mounted on a peripheral surface of the cylindrical housing 3(S2). One driving power supply harness 8(S2) is connected at the bottom peripheral surface of 3(S2) to terminal end 6A(S2). The other two driving power supply harnesses 9(S2) and 10(S2) are connected at the top peripheral surface of the cylindrical housing 3(S2) to connecting members 7A(S2), 7C(S2).

Accordingly, the driving power supply harnesses 8,9, 10 attached to the connecting members 6,7 of the first stator S1 are arranged 180 degrees circumferentially from each other. Also, the driving power supply harnesses 8, 9, 10 attached to the connecting members 6, 7, of the second stator S2 are arranged 180 degrees circumferentially from each other.

The driving power supply harnesses 8, 9, and 10, connected to stators S1, S2 form two groups. The group mounted to the top adjacent peripheral surfaces of S1, S2 comprises driving power supply harnesses 8(S1) and 9(S2), 10(S2). The group mounted to the bottom adjacent peripheral surfaces of S1, S2 comprises 8(S2) and 9(S1), 10(S1). In each group, power supply harness 8 has a positive polarity and the other two power supply harnesses 9 and 10 have a negative polarity. This grouping arrangement forms a triangle connection over the two corresponding peripheral surfaces of S1 and S2 with the positive driving supply harness 8 mounted on one surface and the two negative driving supply harnesses 9 and 10 equally spaced and mounted on the other corresponding surface.

As will be apparent from FIGS. 2A to 2C, supports 6 and 7 of the first stator S1 is mounted with a circumferential space of 180 degrees therebetween to avoid any fear of short circuit, when a driving power supply harness is fallen out of the terminal due to long time vibration or external force. As the terminals 6A, 7A, 7C are divided into two groups which are mounted to the two supports 6, 7, respectively, the space between terminals can be widened, thereby permitting easier connecting operation. Furthermore, even when any strong external force is applied to the driving power supply harness, the external force has no direct influence upon the terminal wire of the coil 2.

Having thus described the preferred embodiments of the invention, it should be understood that numerous structural modifications and adaptations may be made without departing from the spirit of the invention.

What is claimed is:

1. A stator assembly in a step motor connected to driving power supply harnesses for supplying electric current to the stator, said assembly comprising:
   (a) first and second cylindrical housings attached to each other at opposite ends thereof;
   (b) first and second stator coils installed in said first and second housings;
   (c) first and second pairs of connecting members for connecting terminal ends of said first and second stator coils to said driving power supply harnesses, said first pair of said connecting members being mounted on a peripheral surface of said first cylindrical housing, said second pair of said connecting members being mounted on a peripheral surface of said second cylindrical housing at positions corresponding to positions of said first pair of said connecting members; and,
   (d) said driving power supply harnesses comprising two groups with each group having three terminals, one power supply harness of each of said groups having a positive polarity and the others having a negative polarity, said positive terminal of said three terminals of said one group being connected to one terminal end of said first pair of connecting members, while the other two negative terminals being connected to said terminal ends of said second pair of connecting members positioned in corresponding relationship to said one connecting member of said first pair of connecting members; said positive terminal of said three terminals of the other group being connected to the other connecting member of said second pair of connecting members, while the other two negative terminals being connected to said terminal end said first pair of connecting members positioned in corresponding relationship to said other connecting member of said second pair of connecting members, and a triangle connection is formed over the two corresponding peripheral surfaces with said positive terminal on one surface and said two negative terminals on the other corresponding surface.

2. The stator assembly as defined in claim 1 wherein said connecting members in each pair are arranged 180 degrees circumferentially spaced from each other.

* * * * *